(12) United States Patent
Gibble et al.

(10) Patent No.: US 8,919,123 B2
(45) Date of Patent: Dec. 30, 2014

(54) WASTE HEAT RECOVERY SYSTEM WITH PARTIAL RECUPERATION

(75) Inventors: John Gibble, Chambersburg, PA (US); Arne Andersson, Molnycke (SE)

(73) Assignee: Mack Trucks, Inc., Greensboro, NC (US)

( * ) Notice: Subject to any disclaimer, the term of this patent is extended or adjusted under 35 U.S.C. 154(b) by 173 days.

(21) Appl. No.: 13/806,163

(22) PCT Filed: Jul. 14, 2011

(86) PCT No.: PCT/US2011/043994
§ 371 (c)(1),
(2), (4) Date: Apr. 5, 2013

(87) PCT Pub. No.: WO2012/009526
PCT Pub. Date: Jan. 19, 2012

(65) Prior Publication Data
US 2013/0186087 A1    Jul. 25, 2013

Related U.S. Application Data

(60) Provisional application No. 61/364,201, filed on Jul. 14, 2010.

(51) Int. Cl.
*F01K 23/10* (2006.01)
*F02G 3/00* (2006.01)
(Continued)

(52) U.S. Cl.
CPC ... *F01N 5/02* (2013.01); *F01K 7/40* (2013.01); *F01K 13/02* (2013.01); *F01K 23/065* (2013.01); *F02G 5/02* (2013.01); *Y02T 10/16* (2013.01)
USPC ................. 60/618; 60/616; 60/320; 60/605.2

(58) Field of Classification Search
CPC ......... F01K 7/40; F01K 13/02; F01K 23/065; F01N 5/02; F02G 5/02; F02G 5/04; Y02T 10/16
USPC ......... 60/618, 616, 620, 505.2, 320, 597–598
See application file for complete search history.

(56) References Cited

U.S. PATENT DOCUMENTS

| 4,334,409 A | 6/1982 | Daugas |
| 4,901,531 A | 2/1990 | Kubo et al. |

(Continued)

FOREIGN PATENT DOCUMENTS

| CN | 1110762 A | 10/1995 |
| CN | 1807848 A | 7/2006 |

(Continued)

OTHER PUBLICATIONS

International Search Report and Written Opinion of corresponding PCT/US2011/043994.

(Continued)

*Primary Examiner* — Christopher Jetton
*Assistant Examiner* — Ngoc T Nguyen
(74) *Attorney, Agent, or Firm* — Martin Farrell; Michael Pruden

(57) ABSTRACT

A waste heat recovery apparatus for use with an internal combustion engine includes a working fluid circuit having a first heating line and a second heating line parallel to the first heating line, a first heat exchanger in the first heating line operatively connected to transfer heat energy to the working fluid from a waste exhaust flow of an internal combustion engine, a second heat exchanger in the second heating line operatively connected to transfer heat energy to the working fluid from recirculating exhaust gas the internal combustion engine, and a recuperative heat exchanger operatively connected to transfer heat energy to the working fluid in the first heating line from the working fluid at a junction of an expander outlet and condenser inlet.

9 Claims, 2 Drawing Sheets

(51) Int. Cl.
*F01N 5/02* (2006.01)
*F02B 33/44* (2006.01)
*F01K 7/40* (2006.01)
*F01K 13/02* (2006.01)
*F01K 23/06* (2006.01)
*F02G 5/02* (2006.01)

(56) References Cited

U.S. PATENT DOCUMENTS

| | | |
|---|---|---|
| 5,440,882 A | 8/1995 | Kalina |
| 6,470,683 B1 | 10/2002 | Childs et al. |
| 6,598,396 B2 | 7/2003 | Bailey |
| 7,650,761 B2 | 1/2010 | Inaba et al. |
| 7,866,157 B2 | 1/2011 | Ernst et al. |
| 8,302,399 B1* | 11/2012 | Freund et al. .................. 60/618 |
| 8,584,457 B2* | 11/2013 | Kardos et al. .................. 60/618 |
| 8,720,202 B2* | 5/2014 | Stegmaier et al. .............. 60/618 |
| 8,789,370 B2* | 7/2014 | Stegmaier et al. .............. 60/618 |
| 2003/0093994 A1 | 5/2003 | Bailey |
| 2005/0262842 A1* | 12/2005 | Claassen et al. ................ 60/618 |
| 2009/0211253 A1* | 8/2009 | Radcliff et al. ................. 60/670 |
| 2009/0241543 A1 | 10/2009 | Ernst |
| 2010/0139626 A1 | 6/2010 | Raab et al. |
| 2010/0180584 A1* | 7/2010 | Berger et al. ................... 60/320 |
| 2010/0294217 A1 | 11/2010 | Kasuya et al. |
| 2011/0016863 A1 | 1/2011 | Ernst |
| 2011/0048002 A1 | 3/2011 | Taylor et al. |
| 2011/0048012 A1 | 3/2011 | Ernst et al. |
| 2011/0072816 A1 | 3/2011 | Ernst et al. |
| 2013/0199178 A1* | 8/2013 | Kanou et al. ................. 60/605.2 |
| 2013/0219872 A1* | 8/2013 | Gibble et al. ................... 60/320 |
| 2014/0013743 A1* | 1/2014 | Dane .............................. 60/618 |

FOREIGN PATENT DOCUMENTS

| | | |
|---|---|---|
| CN | 101614139 A | 12/2009 |
| CN | 101749096 A | 6/2010 |
| JP | 2001248409 A | 9/2001 |

OTHER PUBLICATIONS

Translated office action and search report of corresponding China application No. 201180034786.3 dated Jul. 2, 2014

* cited by examiner

WASTE HEAT RECOVERY SYSTEM WITH PARTIAL RECUPERATION

This application claims the benefit of U.S. Provisional Application No. 61/364,201, filed Jul. 14, 2010.

FIELD OF THE INVENTION

The invention relates to Waste Heat Recovery (WHR) systems coupled with internal combustion engines and, more specifically, to an apparatus and method for improving the recovery of heat energy from the working fluid of a WHR.

BACKGROUND AND SUMMARY

Waste heat recovery systems can make available for use energy in exhaust gases that would otherwise be lost. When incorporated in a vehicle with an internal combustion engine, waste heat recovery systems add certain advantages. For example, the waste heat recovery system can be designed to recover heat from the EGR (exhaust gas recirculation) system, which reduces the cooling load on the engine cooling system.

In addition, a waste heat recovery system can extract useful energy from the exhaust gas exiting the tail pipe or exhaust stack, which would otherwise be lost to the environment.

The invention provides a method and apparatus for improving the recovery of waste heat from an internal combustion engine exhaust. The recovery of additional energy improves efficiency of the system as a whole.

In addition, according to one aspect, the invention improves the operation of the waste heat recovery system itself, by, for example, reducing the cooling load on a waste heat recovery system condenser.

Further, by preheating the working fluid before it enters an exhaust gas heat exchanger, the exhaust gas remains at a higher temperature, avoiding condensation in an exhaust gas flow.

A waste heat recovery apparatus for an internal combustion engine may include a working fluid circuit on which are connected an expander for converting heat energy to mechanical or electrical energy, a condenser, a pump for moving the working fluid through the circuit, and a first heat exchanger for transferring heat from the internal combustion engine exhaust to the working fluid.

According to the invention, the working fluid circuit includes a first heating line and a second heating line in parallel with the first heating line. A first heat exchanger or boiler is connected in the first heating line and operatively connected to an exhaust gas conduit carrying exhaust gas to a stack outlet or tail pipe.

A second heat exchanger is provided in the second heating line by connecting the working fluid circuit to an exhaust gas recirculation cooler configured to transfer heat to the working fluid from the exhaust gas being recirculated to the engine air intake.

A valve downstream of the pump and responsive to an enthalpy demand of the waste heat recovery system controls the flow and distribution of working fluid into the first heating line and second heating line.

Alternatively, a pump may be positioned, on each of the first heating line and the second heating line, both pumps downstream of a junction where the working fluid circuit branches into the two heating lines, each pump being controlled responsive to the enthalpy demand of the system to pump a flow of working fluid into the respective heating line. The pumps may be variable speed or variable output pumps.

Alternatively, each of the first heating line and second heating line may include a bypass arrangement, including a bypass line and valve, to carry a portion or all of the pump output and return it to the condenser, the pump inlet, or a reservoir tank.

Enthalpy demand takes into account the output demand of the waste heat recovery system, the available heat energy from the engine exhaust, and internal limitations of the system, such as a temperature limit of the working fluid, heat rejection load on the condenser, and other factors as will be appreciated by those skilled in the art.

According to another aspect of the invention, a recuperative heat exchanger is operatively connected to transfer heat from working fluid at the junction of the expander outlet and condenser-inlet (a higher-temperature, lower-pressure location) to the first heating line upstream of tire first heat exchanger (a lower-temperature, higher-pressure location).

Advantageously, the recuperative heat exchanger recycles some of the heat that would otherwise be rejected through the condenser as waste heat; thus, an effect of the recuperative heat exchanger is to increase the overall energy-conversion efficiency. In addition, the recuperative heat exchanger removes heat energy from the working fluid that would otherwise have to be removed by the condenser, thus lessening the cooling demand on the condenser.

In the description of the invention, the apparatus and method are described in connection with a Rankine cycle waste heat recovery apparatus, but it should be understood that the invention applies to other waste heat recovery or recuperation devices.

BRIEF DESCRIPTION OF THE DRAWINGS

The invention will be better understood by reference to the following detailed description read in conjunction with the appended drawings, in which.

DETAILED DESCRIPTION OF THE INVENTION

Figure 1:
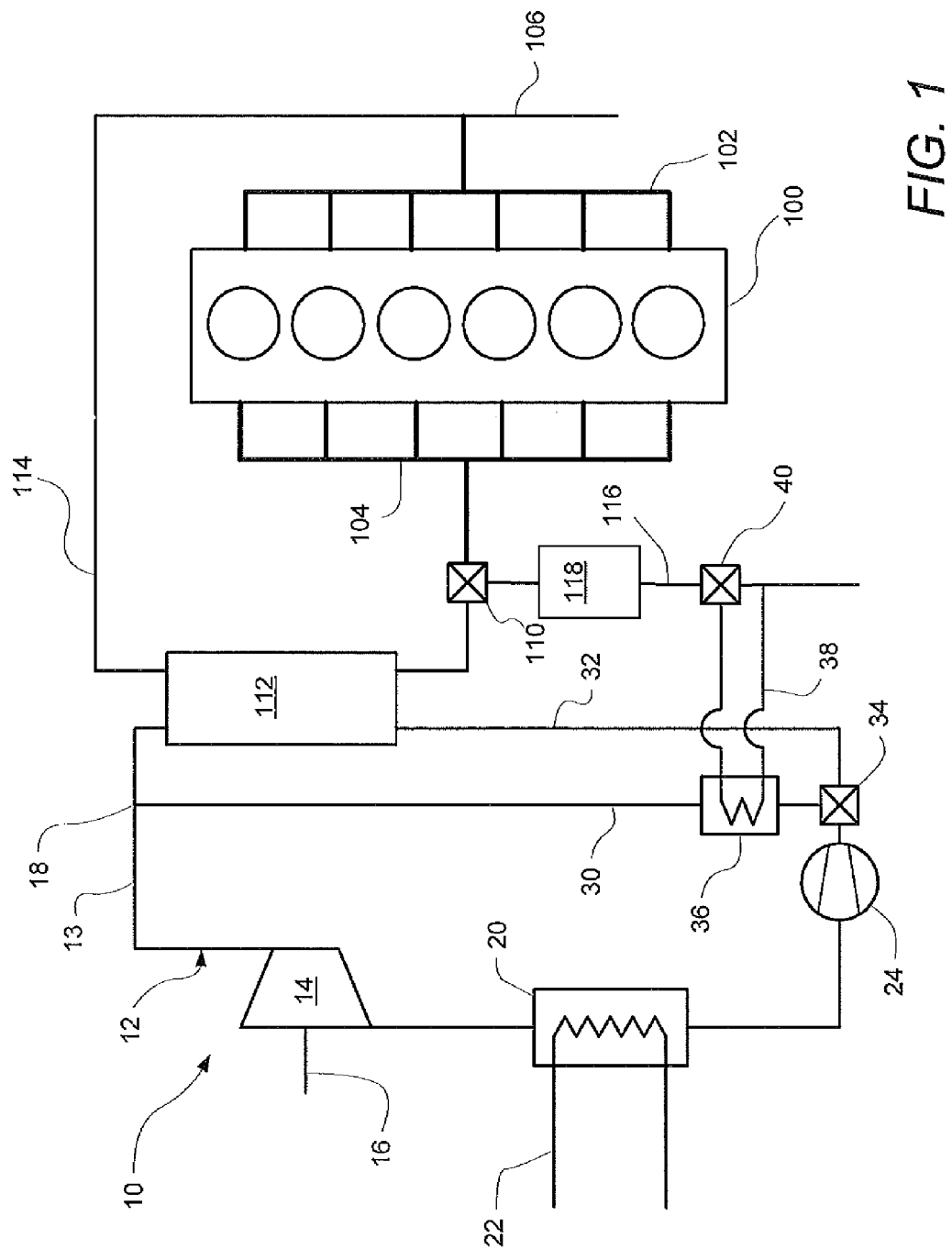
FIG. 1 is a schematic of a first embodiment of a waste heat recovery apparatus according to the invention shown connected to an internal combustion engine; and, FIG. 2 is a schematic of a second embodiment of a waste heat recovery apparatus according to the invention.

FIG. 1, below, shows as an example of an application of the invention, a waste heat recovery apparatus 10 according to the Rankine cycle for an internal combustion engine 100. The invention is shown in conjunction with a Rankine cycle waste heat recovery apparatus. However, the embodiment shown and described is meant to be illustrative and not limiting; the invention may be applied to other waste heat recovery cycles and apparatuses, for example, thermoelectric, Ericsson, or other bottoming cycles.

The internal combustion engine 100 includes an intake manifold 102 and an exhaust manifold 104. A portion of the exhaust gas is recirculated to the intake manifold 102 by an exhaust gas recirculation (EGR) system including an EGR valve 110, an EGR cooler 112, and return line 114 connecting to the intake manifold. Fresh air is supplied to the intake manifold through intake line 106, which may be supplied by a turbocompressor (not shown), as is known in the art.

The EGR valve 110 also controls the flow of exhaust gas to an exhaust conduit 16, for example, an exhaust stack or tailpipe, from which waste exhaust gas is released into the environment.

The internal combustion engine 100 may also include, as mentioned, a turbocompressor driven by the exhaust gas. Other devices may be included, for example, a compound turbine driven by the exhaust gas to generate electrical energy. The internal combustion engine may also include an exhaust aftertreatment system 118 to, for example, convert NOx and remove particulate matter or unburned hydrocarbons from the exhaust gas before it is released to the environment.

The waste heat recovery apparatus 10, as shown in this exemplary embodiment, is a closed loop system in which a working fluid is compressed, heated by the exhaust gas, and expanded to recover heat energy.

The waste heat recovery apparatus 10 as shown includes a working fluid circuit 12, formed as a closed loop through which a working fluid is circulated. An expander 14 is connected on the working fluid circuit 12 to be driven by working fluid to convert heat energy in the working fluid into mechanical energy. An output shaft 16 may be connected to drive an electrical generator or connected to the provide torque to the engine. The expander 14 may be a turbine as illustrated, or a scroll expander, a thermoelectric converter, or other device capable of recovering heat energy from a working fluid.

A condenser 20 is connected on the working fluid circuit 12 to receive working fluid that exits the expander 14. The condenser 20 cools and condenses the working fluid. A condenser cooler loop 22 is connected for carrying away from the condenser 20 heat transferred from the working fluid to a cooling fluid. The condenser cooler loop 22 may conveniently connect to the vehicle cooling system, i.e., the radiator, or another cooling system.

A pump 24 receives the condensed working fluid exiting the condenser 20 and pumps the working fluid to the heating side of the working fluid circuit 12 where the working fluid is heated.

The heating side of the working fluid circuit 12 includes a first heating line 30 and a second heating line 32 arranged in parallel. The first heating line 30 and second heating line 32 branch at a dividing junction on which a valve 34 is connected that controls the flow of working fluid into the heating lines. The valve 34 may direct the flow selectively into one heating line or divide the flow into both of the heating lines 30, 32, responsive to the system demands and limitations, described in more detail below. The heating lines 30, 32 rejoin at a combining junction 18 into a single line 13 that connects to an inlet of the expander 14.

Figure 2:
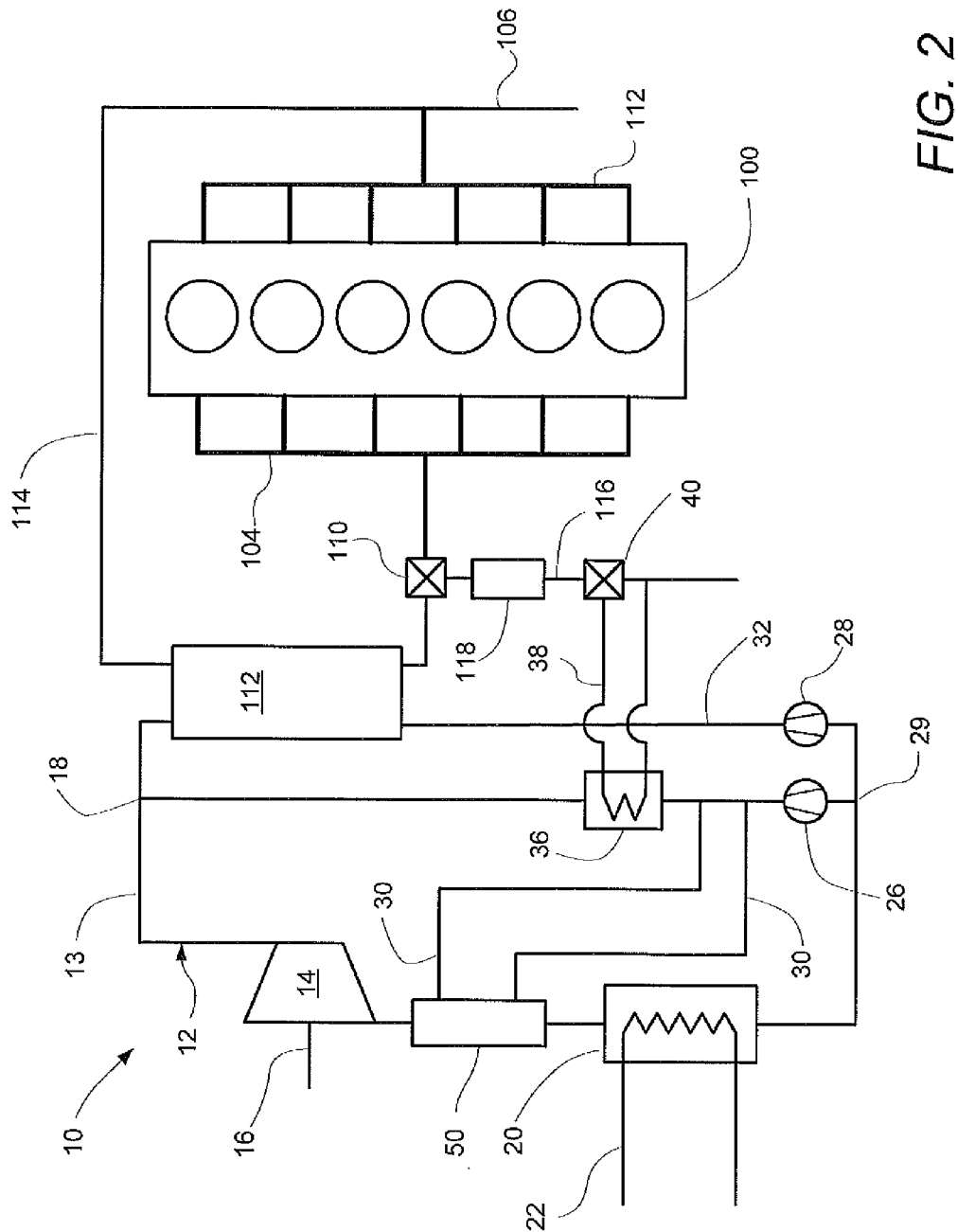

FIG. 2 illustrates an alternative arrangement in which the valve 34 is omitted and each of the heating lines includes a pump to control the flow and pump the working fluid into that line. A first pump 26 is positioned on the first heating line 30 and a second pump 28 is positioned on the second heating line 32. The working fluid circuit 12 divides at a first dividing function 29 into the first heating line 30 and second heating line 32 upstream of the pumps 26, 28. The pumps 26, 28 may be variable output or variable speed pumps to control the flow of working fluid into the beating lines 30, 32. The pumps 26, 28 may be controlled to selectively direct the heating fluid into one heating line or divide the flow into both heating lines 30, 32. Alternatively, the working fluid flow may be controlled by use of by-pass arrangements, including a bypass line and valve, included in each of the first heating line 30 and second heating line 32. It should be understood that the dual pump arrangement of FIG. 2 may be used in the embodiment of FIG. 1 and the pump and valve arrangement of FIG. 1 may be used in the embodiment of FIG. 2.

The first heating line 30 is operatively connected to a boiler 36 or heat exchanger that transfers heat from waste engine exhaust gas that will be released to the environment. The exhaust gas is conducted to the boiler 36 by a loop 38 controlled by a valve 40 in the exhaust conduit 116.

The second heating line 32, parallel to the first, heating line, branches at the valve 34 and is operatively connected to the EGR cooler 112 for transferring heat from the EGR gas to the working fluid. The EGR cooler 112 acts as a boiler for the working fluid in the second heating line 32. The working fluid flowing in the first heating line 30 and second heating line 32, heated by the exhaust boiler 36 and EGR cooler 112, respectively, is combined at combining junction 29 in line 13 and directed to the expander 14.

By using separate heating lines, the working fluid used for recovering heat energy from the EGR cooler 112, which cools the EGR gas, is at a lower temperature as it enters the EGR cooler than it would be if the working fluid was heated by the exhaust gases in the exhaust gas boiler 36 prior to entry in the EGR cooler. This has the advantage of more effective operation of the EGR cooler 112.

The working fluid exiting the expander 14 is at a temperature significantly higher than the condensation temperature of the working fluid, for example, in the illustrated waste heat recovery apparatus it can be about 100° C. higher than the condensation temperature. This heat energy has to be removed from the working fluid, and in the apparatus of FIG. 1, the heat load is transferred to the condenser heat exchanger 22 and is not recuperated FIG. 2 shows an alternative embodiment according to the invention in which some heat energy in the working fluid after expansion in the expander 14 is recovered. FIG. 2 also shows an alternative arrangement for dividing the working fluid flow into the first heating line 30 and second heating line 32, as described above. FIG. 2 otherwise includes all of the other components of the engine 100 and waste heat recovery system 10, also as described above, which will not be repeated here.

According to the embodiment shown in FIG. 2, a recuperative heat transfer apparatus 50, or recuperator, is operatively connected to the working fluid circuit 12 downstream of the expander 14 outlet and upstream of the condenser 20 inlet to recover heat from the working fluid before the working fluid flows through the condenser. The recuperator 50 may be configured as a heat exchanger or any other device capable of transferring heat from one flow to another. The recuperator 50 is connected to deliver heat energy from the expanded working fluid to the working fluid downstream of the condenser 20 and into the first heating line 30 in the illustrated embodiment, the first heating line 30 is routed to the recuperator 50 before connecting to the exhaust gas heat exchanger 36.

Heat transfer by the recuperator 50 advantageously lowers the cooling demand on the condenser 20. In addition, the working fluid in the first heating line 30 is pre-heated before entering the boiler 36, which improves the energy quality of the working fluid in the first heating line 30 and heat recovery from the exhaust gas conduit 116. The higher working fluid temperature entering the boiler 36 also has the advantage that the exhaust gas exiting the stack 116 truck is less likely to be cooled to condensation temperatures.

Because the additionally heated working fluid is added only to the first heating line, and not the second heating line including the EGR cooler, the working fluid is not overheated in the EGR cooler and the EGR cooler can more readily cool the EGR gas to the desired or target temperature for use by the engine.

The invention has been described in terms of preferred principles, embodiments, and componentry; however, those skilled in the art will understand that some substitutions may be made without departing from the scope of the invention as defined by the appended claims.

The invention claimed is:

1. A waste heat recovery apparatus for use with an internal combustion engine, comprising:
   a working fluid circuit;
   an expander connected in the working fluid circuit to receive working fluid;
   a condenser connected in the working fluid circuit to receive the working fluid from the expander;
   a first heating line in the working fluid circuit including a first heat exchanger operatively connected to transfer heat energy to the working fluid from a waste exhaust gas flow of an internal combustion engine;
   a second heating line in the working fluid circuit parallel to the first heating line and having a second heat exchanger operatively connected to transfer heat energy to the working fluid from an exhaust gas recirculation cooler of an internal combustion engine,
   wherein, the first heating line and the second heating line include a dividing junction upstream of the first heat exchanger and second heat exchanger and a combining junction downstream of the first heat exchanger and second heat exchanger.

2. The apparatus of claim 1, comprising a valve connected at the dividing junction to control a flow of the working fluid selectively into at least one of the first heating line and second heating line.

3. The apparatus of claim 1, comprising a first pump connected on the first heating line and a second pump connected on the second heating line for controlling a flow of working fluid selectively into at least one of the first heating line and the second heating line.

4. The apparatus of claim 1, wherein the expander has an outlet from which working fluid exits the expander, and further comprising a recuperator operatively connected to transfer heat energy from the working fluid exiting the expander to the working fluid in the first heating line.

5. The apparatus of claim 4, wherein the recuperator is operatively connected to receive heat energy from the working fluid in the working fluid circuit between the condenser and the expander and is operatively connected to deliver heat energy to the working fluid in the first heating line upstream of the first heat exchanger.

6. A waste heat recovery apparatus for use with an internal combustion engine, comprising:
   a working fluid circuit having a first heating line and a second heating line parallel to the first heating line;
   an expander connected in the working fluid circuit to receive working fluid;
   a condenser connected in the working fluid circuit to receive working fluid from the expander, the working fluid circuit dividing at a first junction into the first heating line and the second heating line downstream of the condenser;
   a first boiler in the first heating line operatively connected to transfer heat energy to the working fluid from a waste exhaust flow of an internal combustion engine;
   a second boiler in the second heating line operatively connected to transfer heat energy to the working fluid from recirculating exhaust gas of the internal combustion engine;
   wherein, the first heating line and the second heating line combine at a second junction downstream of the first boiler and second boiler; and,
   a recuperator operatively connected to transfer heat energy to the working fluid in the first heating line from the working fluid exiting the expander.

7. The apparatus of claim 6, comprising a valve connected at the first junction to control a flow of the working fluid selectively into at least one of the first working fluid heating line and second working fluid heating line.

8. The apparatus of claim 6, comprising a first pump connected on the first heating line and a second pump connected on the second heating line for controlling a flow of working fluid selectively into at least one of the first heating line and the second heating line.

9. The apparatus of claim 6, wherein the recuperator is operatively connected to receive heat energy from the working fluid in the working fluid circuit between the condenser and the expander and is operatively connected to deliver heat to the working fluid in the first heating line upstream of the first boiler.

* * * * *